United States Patent
Zdybel

[19]

[11] Patent Number: 6,105,364
[45] Date of Patent: Aug. 22, 2000

[54] VSTOVL ENGINES

[75] Inventor: Michael J Zdybel, Bristol, United Kingdom

[73] Assignee: Rolls-Royce plc, London, United Kingdom

[21] Appl. No.: 07/591,600

[22] Filed: Sep. 21, 1990

[30] Foreign Application Priority Data

Oct. 11, 1989 [GB] United Kingdom ............... 8922899

[51] Int. Cl.[7] .............................. F02K 1/00; B63H 11/10
[52] U.S. Cl. .................. 60/228; 239/265.19; 239/265.29
[58] Field of Search .............................. 60/226.1, 226.2,
60/226.3, 228, 229, 232, 261, 262, 263;
239/265.19, 265.25, 265.27, 265.29, 265.33,
265.35

[56] References Cited

U.S. PATENT DOCUMENTS 3,280,560  10/1966  Marchant et al. .................... 60/226.1

*Primary Examiner*—Charles T. Jordan
*Attorney, Agent, or Firm*—Oliff & Berridge, PLC

[57] ABSTRACT

A turbofan engine is provided with a conventional air by-pass duct communicating with a plenum chamber downstream of the engine core, vectoring nozzles upstream of the by-pass duct, and a non-vectoring nozzle and a jet-pipe exhausting from the plenum chamber. In conventional forward thrust mode the two sets of nozzles are closed and the jet-pipe is open. In lift thrust mode the jet-pipe is closed and the two sets of nozzles are open, the non-vectoring nozzle providing vertical thrust. The closure member for the vectoring nozzle is arranged, when open, to divert turbofan air to the vectoring nozzles which would otherwise have passed along the by-pass duct, and to divert to the vectoring nozzles exhaust gases from the plenum chamber that are constrained to flow in reverse along the by-pass duct. The non-vectoring nozzle is sized to permit a suitable split between gases exhausting there through and gases reverse flowing along the by-pass duct.

9 Claims, 1 Drawing Sheet

VSTOVL ENGINES

BACKGROUND OF THE INVENTION

This invention concerns improvements in or relating to VSTOVL (vertical short take off vertical landing) gas turbine jet engines. In particular it provides a dual mode turbofan engine which in a first mode produces conventional forward thrust by means of a rear jet-pipe, and in a second mode produces vertical thrust or lift.

On a conventional take-off and landing engine (CTOL) the low pressure compressor (LPC) is sized to suit forward flight thrust requirements. On the other hand, a vertical take-off and landing (VTOL) engine has a need to maintain a particular thrust balance, in the hover mode, between front and rear nozzles. Hitherto, this has been achieved by making the LPC larger (ie oversizing) and so providing increased mass flow (=thrust) for the front nozzles. A natural and undesirable consequence of this is that the engine is larger and heavier than an equivalent CTOL engine. This in turn has the effect of making the airframe larger, thus causing an increase in weight and increased cost of ownership. Further, the increased size and weight of the airframe makes it more difficult for the aircraft to operate in the stealth mode, which is an increasingly important requirement of modern military aircraft.

It is an object of the present invention to provide a turbofan gas turbine jet engine that is capable of both conventional forward thrust and vertical thrust without a significant increase in size or weight.

SUMMARY OF THE INVENTION

According to the present invention there is provided a dual mode gas turbine jet engine including an engine casing, a turbofan, an engine core, a bypass duct between the engine casing and the engine core, and a jet-pipe, wherein there is further provided at least one first jet nozzle located downstream of the turbofan and upstream of the engine core providing communication between the bypass duct and the ambient atmosphere, a second jet nozzle located downstream of the engine core and upstream of the jet-pipe providing communication between a plenum chamber downstream of the engine core and the ambient atmosphere, and first, second, third and fourth closure means to close off respectively the at least one first jet nozzle, the bypass duct, the second jet nozzle, and the jet-pipe, the arrangement of the respective closure means being that, in a first mode of operation, of the at least one first jet nozzle and the second jet nozzle at least the second jet nozzle is closed, the bypass duct is open to air from the turbofan, and the jet-pipe is open, whereby the engine operates in a conventional forward thrust mode; and, in a second mode of operation, the jet-pipe is closed, the at least one first jet nozzle and the second jet nozzle are open, and the bypass duct is closed to air from the turbofan but operates in reverse flow to direct gases from the plenum chamber to the at least one first nozzle, whereby the engine is capable of operating in a lift thrust mode.

There may be provided a plurality of said at least one first jet nozzles arranged circumferentially around the engine casing.

Preferably, there are provided two diametrically opposed first jet nozzles.

Preferably, said at least one first jet nozzle is a vectoring nozzle and the second jet nozzle is a non-vectoring nozzle.

Preferably, the first and second closure means are provided by a common closure member which, in a first configuration blocks off a respective first jet nozzle and leaves open the bypass duct so that a stream of air from the turbofan passes into the bypass duct; and, in a second configuration, opens the respective first jet nozzle and partially closes the bypass duct so as to prevent the ingress of air from the turbofan into the bypass duct but to permit reverse-flow gases through the bypass duct to pass into the respective first jet nozzle.

The closure member may be provided by a pair of doors hinged together about a common hinge, and a rotatable elongate screw member having screw thread portions of opposite hand extending towards the middle of the screw member from opposed ends of the member, the screw member extending across the throat of the respective first jet nozzle and through opposed screw-thread receiving portions of the doors either side of the hinge, each said opposed screw-thread receiving portion cooperating with a respective screw thread portion of the screw member, whereby rotation of the screw member in one direction will tend to locate the doors in a common plane either side of the hinge and give effect to the first configuration, and rotation in the opposite direction will close the doors towards each other and give effect to the second configuration.

The third closure means may be provided by a series of vanes across the throat of the second jet nozzle.

The fourth closure means may be provided by a clamshell closure door.

Preferably, the jet-pipe is a vectoring jet-pipe.

Preferably, there is provided a reheat system in association with the jet-pipe.

The engine core casing may be a structure having double walls defining between them an annular air cooling duct whereby cooling air may be passed through the duct in the casing.

The reverse flow bypass duct of the invention enables the engine to operate in forward thrust mode and vertical thrust mode with a front/rear thrust split that does not need an oversize LPC.

BRIEF DESCRIPTION OF DRAWING

The invention will now be described by way of example only with reference to the accompanying schematic drawing FIG. 1 which shows a split longitudinal section through part of a jet engine showing, in the upper half of the drawing, a lift mode of the engine, and, in the lower half of the drawing, a conventional forward thrust mode of operation of the engine.

DESCRIPTION OF PREFERRED EMBODIMENT

Figure 1:
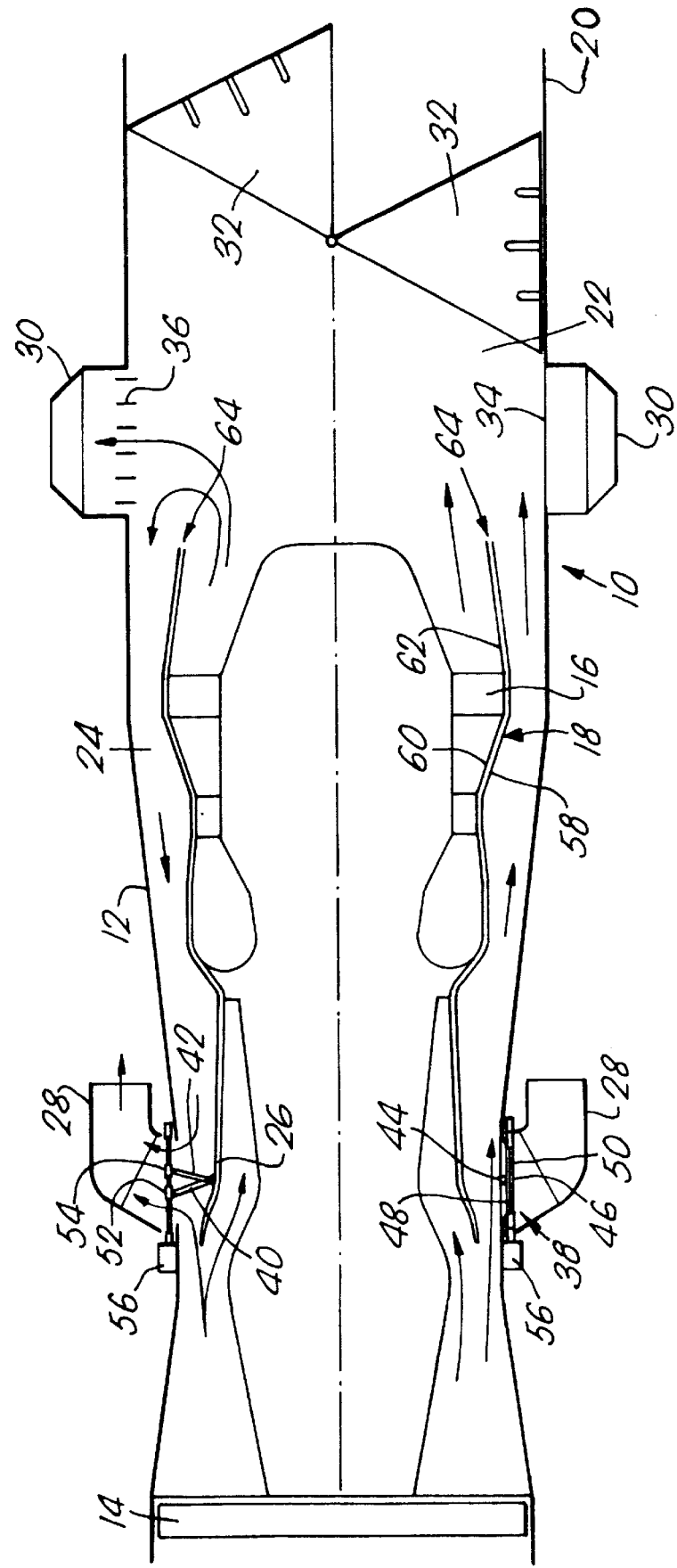

Referring to FIG. 1 there is shown generally a gas turbine jet engine 10 provided with an engine casing 12, a turbofan 14, an engine core section 16 enclosed in a core casing 18, a rear jet-pipe 20, and a plenum chamber 22 between the core section and the jet-pipe to receive combustion gases exiting the core section. The plenum chamber 22 is provided with a mix and burn reheat system which in the interests of clarity is not illustrated but which is well-known in the art.

The core casing 18 is spaced from the engine casing 12 to provide an air bypass duct 24 which channels some of the air from the turbofan 14 to the plenum chamber 22 in a known manner. A cylindrical wall 26 is provided forward of the bypass duct 24 to divide the air from the turbofan 14 into two streams, one of which is directed into the bypass duct, and the other one of which is directed into the engine core section 16.

A pair of vectoring fixed area nozzles 28 are provided attached to apertures in the engine casing 12 located diametrically opposite each other immediately forward of the cylindrical wall 26. The vectoring nozzles 28 are in gas flow communication with the air flow from the turbofan 14, and can, if required, eject air from the turbofan into the ambient atmosphere and generate thrust. Because of the vectoring function of the nozzles 28, the direction of the thrust generated may be controlled by the pilot.

A fixed area non-vectoring nozzle 30 is provided attached to an aperture in the engine casing 12 aft of the engine core 16 located at bottom dead center of the engine casing and in flow communication with the plenum chamber 22. The non-vectoring nozzle 30 is therefore able to generate lift thrust if required.

The jet-pipe 20 is provided with a closure member 32 which, in the exemplified embodiment, is a clamshell door well-known in the art. The clamshell door 32 is rotatable about an axis from a first position in which exit gases from the engine leave the plenum chamber 22 through the jet-pipe 20 to provide thrust, to a second position in which the jet-pipe is blocked off and thrust through the jet-pipe is no longer possible. The jet-pipe 20 features a vectoring capability, details of which are not illustrated in the interests of clarity but which are well-known in the art. The non-vectoring nozzle 30 is provided with a closure member 34 which comprises a number of vanes or slats 36 each rotatable about a respective longitudinal axis. Rotation of the slats 36 so that they lie in the plane of the engine casing 12 in that region blocks off the non-vectoring nozzle 30, and rotation of the slats through 90° renders the non-vectoring nozzle fully open.

Each vectoring nozzle 28 and the bypass duct 24 share a common closure member 38. In a first configuration (conventional forward thrust mode—bottom half of the drawing) closure member 38 blocks off the vectoring jet nozzle 28 and leaves open the bypass duct 24 so that a stream of air from the turbofan 14 passes into the bypass duct. In a second configuration (lift mode—top half of the drawing) the closure member 38 opens the vectoring jet nozzle 28 and partially closes the bypass duct 24 so as to prevent the ingress of air from the turbofan 14 into the bypass duct and instead to permit reverse-flow gases through the bypass duct to pass into the vectoring jet nozzle.

The closure member 38 is provided by a pair of doors 40, 42 hinged together about a common hinge 44, and a rotatable elongate screw member 46 having screw thread portions 48, 50 of opposite hand extending towards the middle of the screw member. The screw member 46 is driven by a motor 56 and extends across the throat of the vectoring jet nozzle 28 and through opposed screw-thread receiving portions 52, 54 respectively of the doors 40, 42 either side of the hinge 44. Each opposed screw-thread receiving portion 52, 54 cooperates with a respective screw thread portion 48, 50 of the screw member 46 so that rotation of the screw member in one direction will tend to locate the doors 40, 42 in a common plane either side of the hinge 44 and block off the vectoring jet nozzle 28 as in the first configuration. Rotation of the screw member 46 in the opposite direction will give effect to the second (lift) configuration by closing the doors 40, 42 towards each other so that their common hinge 44 abuts the cylindrical wall 26 at the entrance to the bypass duct 24 and prevents air from the turbofan 14 from entering the bypass duct whilst permitting air from the turbofan and gases from the plenum chamber 22 passing in reverse flow along the bypass duct to exit through the vectoring nozzle 28 on opposite sides of the doors.

The core casing 18 is a structure having spaced walls 58, 60 defining between them an annular cooling air duct 62, the air for which is preferably provided by tapping off high pressure air in order that the air bleed from the open end 64 of the cooling air duct can overcome the static pressure of the core stream. It should be noted that core casing cooling can offer a means of achieving tip clearance control on turbine blades within the core.

In conventional forward thrust mode operation of the engine, the engine acts as a normal turbofan engine. The vectoring nozzles 28 are closed and the bypass air mixes with gases exiting from the core section 16 and the core cooling air in the plenum chamber 22, from where the mixture exits through the jet-pipe 20 to provide forward thrust. In this mode the non-vectoring nozzle 30 is closed.

In lift mode of the engine the vectoring nozzles 28 are open, the doors 40, 42 block off access of turbofan air to the bypass duct 24, the clamshell door 32 of the jet-pipe 20 is closed thereby blocking the jet-pipe, and the non-vectoring nozzle 30 is open. Turbofan air which would, in the conventional mode, have been channelled into the bypass duct 24 is now channelled to the vectoring nozzles 28. The gases in the plenum chamber 22 which in the conventional mode would have passed out through the jet-pipe 20 now divide into two portions, one of which exhausts through the non-vectoring nozzle 30 so as to provide vertical thrust, and the other of which passes in reverse flow along the bypass duct 24 to exhaust through the vectoring nozzles 28. The non-vectoring nozzle 30 is sized so as to permit the desired division of gases exhausting through the non-vectoring nozzle and passing in reverse flow along the bypass duct 24.

The reverse flow bypass duct of the invention increases the front nozzle thrust by energising the air with hotter, higher energy exhaust gases. Thus the problems inherent in designing an oversize fan are avoided, and it is possible to achieve the design aim of a CTOL optimised engine that can provide vertical thrust.

I claim:

1. A dual mode gas turbine jet engine including an engine casing, a turbofan, an engine core, a bypass duct between the engine casing and the engine core, and a jet-pipe, wherein there is further provided at least one first jet nozzle located downstream of the turbofan and upstream of the engine core providing communication between the bypass duct and the ambient atmosphere, a second jet nozzle located downstream of the engine core and upstream of the jet-pipe providing communication between a plenum chamber downstream of the engine core and the ambient atmosphere, and first, second, third and fourth closure means to close off respectively the at least one first jet nozzle, the bypass duct, the second jet nozzle, and the jet-pipe, the arrangement of the respective closure means being that, in a first mode of operation, of the at least one first jet nozzle and the second jet nozzle at least the second jet nozzle is closed, the bypass duct is open to air from the turbofan, and the jet-pipe is open, whereby the engine operates in a conventional forward thrust mode; and, in a second mode of operation, the jet-pipe is closed, the at least one first jet nozzle and the second jet nozzle are open, and the bypass duct is closed to air from the turbofan but operates in reverse flow to direct gases from the plenum chamber to the at least one first nozzle, whereby the engine is capable of operating in a lift thrust mode.

2. A jet engine as claimed in claim 1 wherein there is provided a plurality of said at least one first jet nozzles arranged circumferentially around the engine casing.

3. A jet engine as claimed in claim 2 wherein there are two diametrically opposed first jet nozzles.

4. A jet engine as claimed in claim 1 wherein said at least one first jet nozzle is a vectoring nozzle and the second jet nozzle is a non-vectoring nozzle.

5. A jet engine as claimed in claim 1 wherein the first and second closure means are provided by a common closure member which, in a first configuration blocks off a respective first jet nozzle and leaves open the bypass duct so that a stream of air from the turbofan passes into the bypass duct; and, in a second configuration, opens the respective first jet nozzle and partially closes the bypass duct so as to prevent the ingress of air from the turbofan into the bypass duct and to permit reverse-flow gases through the by-pass duct to pass into the respective first jet nozzle.

6. A jet engine as claimed in claim 5 wherein the closure member is provided by a pair of doors hinged together about a common hinge, and a rotatable elongate screw member having screw thread portions of opposite hand extending towards the middle of the screw member from opposed ends of the member, the screw member extending across the throat of the respective first jet nozzle and through opposed screw-thread receiving portions of the doors either side of the hinge, each said opposed screw-thread receiving portion cooperating with a respective screw thread portion of the screw member, whereby rotation of the screw member in one direction will tend to locate the doors in a common plane either side of the hinge and give effect to the first configuration, and rotation in the opposite direction will close the doors towards each other and give effect to the second configuration.

7. A jet engine as claimed in claim 1 wherein the third closure means is provided by a series of vanes across the throat of the second jet nozzle.

8. A jet engine as claimed in claim 1 wherein the fourth closure means is provided by a clam-shell closure door.

9. A jet engine as claimed in claim 1 wherein the engine core casing is a structure having double walls defining between them an annular air cooling duct whereby cooling air may be passed through the duct in the casing.

* * * * *